(12) United States Patent
Zhao et al.

(10) Patent No.: US 8,575,261 B2
(45) Date of Patent: *Nov. 5, 2013

(54) PREPARATION OF SILICA-CONTAINING EPDM RUBBER COMPOSITION AND USE THEREOF FOR ARTICLES OF MANUFACTURE INCLUDING TIRES AND ENGINEERED PRODUCTS

(75) Inventors: Junling Zhao, Hudson, OH (US); Aaron Scott Puhala, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 940 days.

This patent is subject to a terminal disclaimer.

(21) Appl. No.: 12/550,690

(22) Filed: Aug. 31, 2009

(65) Prior Publication Data

US 2011/0054101 A1 Mar. 3, 2011

(51) Int. Cl.
 *B60C 1/00* (2006.01)
 *C08K 3/34* (2006.01)
 *C08K 3/04* (2006.01)

(52) U.S. Cl.
 USPC .................. 524/526; 524/492; 524/495

(58) Field of Classification Search
 USPC .................... 524/490, 492, 495, 526
 See application file for complete search history.

(56) References Cited

U.S. PATENT DOCUMENTS

| | | | |
|---|---|---|---|
| 5,964,969 A * | 10/1999 | Sandstrom et al. | 152/524 |
| 7,423,089 B2 | 9/2008 | Zhao et al. | 525/232 |
| 7,473,728 B2 * | 1/2009 | Zhao et al. | 524/445 |
| 2006/0135671 A1 | 6/2006 | Zhao et al. | 524/445 |
| 2006/0199910 A1 * | 9/2006 | Walton et al. | 525/192 |
| 2007/0088127 A1 | 4/2007 | Zhao et al. | 524/192 |
| 2007/0179247 A1 | 8/2007 | Sandstrom et al. | 524/191 |
| 2009/0062434 A1 | 3/2009 | Chen et al. | 524/59 |

OTHER PUBLICATIONS

European Search Report completed Dec. 9, 2010.

* cited by examiner

*Primary Examiner* — Angela C Scott
(74) *Attorney, Agent, or Firm* — Henry C. Young, Jr.

(57) ABSTRACT

This invention relates to preparation of precipitated silica-containing EPDM based rubber compositions and their use as components of articles of manufacture such as, for example, tires and industrial products. Such preparation relies upon phase mixing of EPDM based rubber compositions which contain particulate reinforcement, such as for example precipitated silica, which may optionally include exfoliated clay reinforcement, to create an enhanced EPDM rubber composition. In one aspect, the invention relates to a pneumatic rubber tire with a visible outer sidewall rubber layer comprised of such rubber composition.

9 Claims, No Drawings

PREPARATION OF SILICA-CONTAINING EPDM RUBBER COMPOSITION AND USE THEREOF FOR ARTICLES OF MANUFACTURE INCLUDING TIRES AND ENGINEERED PRODUCTS

FIELD OF THE INVENTION

This invention relates to preparation of precipitated silica-containing EPDM based rubber compositions and their use as components of articles of manufacture such as, for example, tires and engineered products. Such preparation relies upon phase mixing of EPDM based rubber compositions with particulate filler comprised of at least one of precipitated silica, exfoliated clay platelets, mica, talc, kaolin clay and calcium carbonate to create an enhanced EPDM rubber composition. In one aspect, the invention relates to a pneumatic rubber tire with a visible outer sidewall rubber layer comprised of such rubber composition.

BACKGROUND OF THE INVENTION

Various articles of manufacture contain at least one component which is based upon an EPDM containing rubber composition. Sometimes it is desired that such EPDM rubber composition contain particulate reinforcing filler such as precipitated silica and exfoliated clay. Other particulate fillers for consideration are, for example, mica, talc, kaolin clay and calcium carbonate. Rubber reinforcing carbon black may also be included in the EPDM based rubber composition.

An example of such article of manufacture having a component containing a low unsaturation rubber such as EPDM rubber is a pneumatic rubber tire where said component is an outer rubber sidewall layer which is be subject to considerable flexing and scuffing as well as atmospheric aging.

Further examples of such articles of manufacture containing such low unsaturation rubber (the EPDM rubber) are various engineered products which rely upon a degree of atmospheric weathering resistance, such as for example, hoses, hose covers, window gaskets, weatherstrips, seals, roofing and insulation related products. For such products, particulate filler may comprise one or more of said mica, talc, kaolin clay and calcium carbonate.

Use of a low unsaturation EPDM based rubber composition has been proposed for such articles of manufacture, particularly for a tire having an outer, atmospherically exposed, sidewall outer layer, to resist its aging because of the resistance of EPDM rubber to atmospheric (e.g. ozone) weathering, primarily because of its low unsaturation (carbon-to-carbon double bond) content. For example, see U.S. Pat. No. 5,386,865. Phase mixing of a precipitated silica-containing EPDM rubber has proposed. For example, see U.S. Pat. No. 7,423,089.

Reinforcement of the EPDM/conjugated diene-based elastomer blend is considered herein to be challenged which relies upon use of a coupling agent to couple the reinforcement, such as for example precipitated silica, to the elastomers is made more difficult because of the significant reduction of availability of carbon-to-carbon double bond (low unsaturation) of the EPDM portion of the composition which tends to restrict the ability of a silica coupling agent to bond to the EPDM portion of the rubber composition.

Indeed, for homogeneous mixing of the EPDM elastomer, conjugated diene-based elastomer, precipitated silica reinforcement and silica coupling agent, the silica reinforcement of the EPDM elastomer portion of the rubber composition is made more difficult because of the low unsaturation of the EPDM thereby rendering it less susceptible to silica coupling, or bonding, of the silica reinforcement to the EPDM elastomer as compared to conjugated diene-based elastomers in the rubber composition such as, for example, cis 1,4-polyisoprene and cis 1,4-polybutadiene elastomers.

It is therefore proposed to evaluate preparation of a coupling agent enhanced reinforcement-containing rubber composition composed of both EPDM and conjugated diene-based elastomers by a phase mixing process.

For such phase mixing process, preparation of an EPDM-containing rubber composition is conducted in, for example, two phases.

In a first mixing phase, EPDM rubber, and particulate filler comprised of precipitated silica and optionally exfoliated clay platelets is mixed with, (A) rubber reinforcing carbon black, or
(B) coloring pigment of a color other than black, without carbon black (where a colored rubber composition other than a black color is desired);

wherein said precipitated silica is provided:
(A) with a silica coupling agent, or
(B) without a silica coupling agent.

If desired, the precipitated silica is used, or provided, together with a silica coupling agent to enhance a rubber reinforcing effect of the precipitated silica to the low unsaturation-containing (low carbon-to-carbon double bond-containing) EPDM rubber.

For products which may be considered as not necessarily needing such degree of coupling of the precipitated silica to the EPDM rubber, the silica coupling agent might desirably not be included, such as example, products like various engineered products exemplary of which are, for example, various hoses, roofing, weather strips and window gaskets, the decision as to not including the silica coupling being made depending upon an individual product property desired.

Optionally, additional low unsaturation polymers, or polymers having a low, or non-existent, carbon-to-carbon double bond unsaturation, may be included with the EPDM rubber in the initial (first) mixing phase such as, for example, at least one of polyethylene, polypropylene, ethylene/propylene copolymers, styrene/ethylene/propylene terpolymers as well as copolymers and halogenated copolymers of paramethylstyrene and isobutylene.

In a second mixing phase, the rubber composition from the first mixing phase is mixed with at least one conjugated diene-based elastomer (e.g. combination of conjugated diene-based elastomers) selected from, for example, cis 1,4-polyisoprene rubber, cis 1,4-polybutadiene rubber and styrene/butadiene rubber, particularly a combination of cis 1,4-polyisoprene and cis 1,4-polybutadiene rubbers where a tire sidewall rubber composition is contemplated which may be subject to flexing and scuffing and exposed to atmospheric conditions such as, for example, ozone exposure.

For either or both of the first and second mixing phases, additional particulate reinforcing fillers, other than said precipitated silica, rubber reinforcing carbon black and exfoliated clay platelets, may be included, if appropriate and desired, such as at least one of mica, talc, kaolin clay, calcium carbonate. Such additional fillers are considered herein as being reinforcing fillers in a sense of providing what is considered herein as providing some degree, although a minor degree, of reinforcement for the elastomers.

By such separate, or segmented, mixing phases, the particulate filler added in the first mixing phase associates itself first, and thereby primarily, with the EPDM rubber, before contact with the conjugated diene-based elastomer(s) which are is (are) added in the second mixing phase.

For example, where precipitated silica is included as the particulate filler, together with silica coupling agent, in the first mixing phase, the silica coupling agent assists in selectively coupling the precipitated silica to the EPDM elastomer prior to contact with the conjugated diene-based elastomer which is added separately in the aforesaid second mixing phase.

In this manner, the coupled reinforcement is (becomes) more effectively (e.g. primarily) associated with the EPDM elastomer portion of the rubber composition in a sense of creating an enhanced filler reinforced EPDM-containing rubber composition, particularly insofar as the silica reinforcement aspect of the rubber composition is concerned. This is a significant aspect of the invention.

In order to facilitate such phase mixing of the rubber composition it is also proposed to evaluate an effect of significantly increasing the content of the coupling agent in the aforesaid silica and/or exfoliated clay platelet reinforcement-containing, low unsaturation-containing EPDM mixing phase, namely the first mixing phase, in order to promote preferential bonding of the particulate reinforcement of silica and/or exfoliated clay platelets to the EPDM.

Historically, in U.S. Pat. No. 7,423,089, a sulfur curable rubber composition is proposed for a tire sidewall which is composed of a combination of at least two diverse EPDM elastomers together with at least one conjugated diene-based elastomer, and reinforcing filler is comprised of at least one of carbon black, silica and exfoliated clay, where the rubber composition is prepared by a phase mixing process.

This invention is intended to differ significantly from such phase mixing process by a selective inclusion of a significantly high content of coupling agent in the silica reinforcement containing EPDM elastomer phase, namely the first mixing phase.

By such sequential phase mixing process, the particulate reinforcement of precipitated silica, which may optionally include exfoliated clay platelets, with the aid of the significant coupler content, remains primarily associated with the EPDM elastomers in the EPDM/conjugated diene-based elastomer (e.g. cis 1,4-polyisoprene and cis 1,4-polybutadiene elastomers) composition in the aforesaid first mixing phase and therefore promotes an enhancement of the overall reinforcement of the rubber composition with particulate reinforcement as at least one of precipitated silica and exfoliated clay platelets as compared to a more simple homogeneous mixing (instead of phase mixing) of the EPDM rubber and conjugated diene-based rubbers.

For the purposes of this invention, the EPDM rubber may be composed of at least two EPDM elastomers which are differentiated from each other.

For such purpose, a first EPDM elastomer is provided which is more elastomeric in nature by containing a higher non-conjugated diene content and thereby promotes a more rapid rate of sulfur curing, insofar as the EPDM elastomer is concerned, to aid in reducing the sulfur rate incompatibility between the EPDM rubber and conjugated diene-based elastomer(s), such as for example the natural cis 1,4-polyisoprene rubber, cis 1,4-polybutadiene and styrene/butadiene rubber.

An optional second EPDM elastomer is provided which is less elastomeric in nature than the first EPDM elastomer by having a lower non-conjugated diene content. Its somewhat higher ethylene content (e.g. therefore a higher ethylene/propylene ratio) may present the second EPDM elastomer as being somewhat being somewhat more self-reinforcing than the first EPDM elastomer in a sense of containing increased polyethylene-based crystalline domains because of its higher ethylene content levels.

The use of the dual EPDM elastomer blend, then, is intended to promote both mechanical strength for the rubber composition and interfacial strength between the EPDM rubbers and conjugated diene-based rubbers, particularly the conjugated-diene based rubbers comprised of cis 1,4-polyisoprene rubber, particularly natural cis 1,4-polyisoprene rubber.

In practice, the non-conjugated diene for the EPDM terpolymer rubber may be selected from, or comprised of, for example, ethylidene norbornadiene, dicyclopentadiene or trans 1,4-hexadiene, with ethylidene norbornadiene being often preferred. Such EPDM terpolymer rubbers, in general, are well known to those having skill in such art.

In the description of this invention, the term "phr" relates to parts by weight of an ingredient per 100 parts by weight of rubber.

The terms "rubber" and "elastomer", "cure" and "vulcanize", and "compound" and "composition" may be used interchangeably unless otherwise indicated.

DISCLOSURE AND PRACTICE OF THE INVENTION

In accordance with this invention, a process of preparing a rubber composition (particularly for a tire sidewall outer layer) comprises phase mixing elastomers comprised of EPDM rubber and at least one conjugated diene-based elastomer including cis 1,4-polyisoprene rubber, and rubber reinforcing particulate filler.

Accordingly, a process of preparing a rubber composition which comprises, based upon parts by weight per 100 parts rubber (phr):

(A) a sequential phase mixing process which comprises:
(1) a first mixing phase comprised of forming a first rubber composition comprised of EPDM rubber containing a dispersion of a particulate filler reinforcement therein, (preferably in an internal rubber mixer), followed by:
(2) a second mixing phase comprised of forming a second rubber composition by blending said first rubber composition with at least one conjugated diene-based rubber wherein said conjugated diene-based rubber includes a cis 1,4-polyisoprene rubber, (preferably in an internal rubber mixer), followed by:
(3) blending sulfur curative comprised of elemental sulfur with said second rubber composition, or
(B) a parallel phase mixing process which comprises:
(1) a first mixing phase comprised of forming a first rubber composition by blending EPDM rubber, particulate rubber reinforcing filler and sulfur curative comprised of elemental sulfur, (preferably in an internal rubber mixer);
(2) a second mixing phase comprised of forming a second rubber composition of:
(a) cis 1,4-polyisoprene rubber, or
(b) cis 1,4-polyisoprene rubber and cis 1,4-polybutadiene rubber;
wherein said rubber composition optionally also contains at least one of styrene/butadiene rubber, polychloroprene rubber, acrylonitrile/butadiene rubber, butyl rubber, halogenated butyl rubber, and brominated copolymer of paramethylstyrene and isobutylene, followed by
(3) blending said first rubber composition with said second rubber composition;
wherein, for said sequential and parallel phase mixing processes, said EPDM rubber is provided as:
(4) an EPDM rubber as an ethylene/propylene/non-conjugated diene terpolymer having an ethylene content (portion of the EPDM terpolymer which is derived from ethylene) in a range of from about 40 to about 90 weight percent and a non-conjugated diene content in a range of about 1 to about 15 weight percent, alternately from about 4 to about 12 weight percent, or (5) a combination of EPDM elastomers as ethylene/propylene/non-conjugated diene terpolymers composed of:
  (a) a first EPDM rubber having an ethylene content (portion of the EPDM terpolymer which is derived from ethylene) of from about 40 to about 70 weight percent, and a non-conjugated diene content in a range of about 1 to about 15 weight percent, alternately from about 4 to about 12 weight percent, and
  (b) a second EPDM rubber having an ethylene content (portion of the EPDM terpolymer which is derived from ethylene) of from about 60 to about 90 weight percent, and a non-conjugated diene content in a range of about 1 to about 15 weight percent, alternately from about 4 to about 12 weight percent, wherein the ethylene content of said second EPDM rubber is at least 10 percentage units higher than the ethylene content of said first EPDM rubber (e.g. if the ethylene content of said first EPDM rubber is 60 weight percent thereof, then the ethylene content of said second EPDM rubber is to 70 percent thereof), and wherein the weight ratio of said first EPDM rubber to said second EPDM rubber is in a range of from about 10/90 to about 90/1 0, alternately from about 40/60 to about 80/20;

wherein said first rubber composition for said first mixing phase contains:

(6) particulate reinforcing filler comprised of:
  (a) precipitated silica (e.g. in an amount of up to about 80 phr, alternately from about 10 to about 60 phr);
  (b) optionally exfoliated clay platelets (e.g. in an amount of up to 10 phr, alternately in a range of from about 0.5 to about 10 phr),
  (c) rubber reinforcing carbon black (e.g. in an amount of up to 100 phr, alternately from about 10 to about 60 phr), and
  (d) optionally at least one of mica, kaolin clay, talc and calcium carbonate (e.g. up to about 70 phr, alternatively in a range of from about 5 to about 50 phr), or (7) particulate reinforcing filler substantially exclusive of, preferably exclusive of, therefore without, rubber reinforcing carbon black comprised of:
  (a) precipitated silica (e.g. in an amount of up to about 80 phr, alternately from about 10 to about 60 phr);
  (b) optionally exfoliated clay platelets (e.g. in an amount of up to 10 phr, alternately in a range of from about 0.5 to about 10 phr),
  (c) optionally at least one of mica, kaolin clay, talc and calcium carbonate (e.g. up to about 70 phr, alternatively in a range of from about 5 to about 50 phr), together with:
  (d) colored pigment (e.g. non-rubber reinforcing pigment) having a color other than black;

wherein said silica coupling agent has a moiety reactive with hydroxyl groups (e.g. silanol groups) on said precipitated silica and another different moiety interactive with carbon-to-carbon double bond unsaturation contained in said EPDM elastomer(s).

In one embodiment, it is seen that the second rubber composition, prepared in said second phase mixing step, contains:
  (A) a portion of said precipitated silica or said rubber reinforcing carbon black, and optionally a portion of said exfoliated clay platelets, or
  (B) combination of precipitated silica and rubber reinforcing carbon black and, optionally said exfoliated clay platelets.

Alternately, the second rubber composition, prepared in said second phase mixing step, contains at least one of alternate reinforcing fillers comprised of at least one of mica, talc, kaolin clay and calcium without carbon black, further, may, if desired, contain non-black colored pigment, in addition to said reinforcing fillers, where a rubber composition is desired having a color other than black.

Examples of rubber reinforcing carbon black may be found, for example, in *The Vanderbilt Rubber Handbook*, 1978 edition, Page 417.

Various commercially-available precipitated silicas may be considered for use in the tread of this invention, such as for example only and without limitation, silica from Rhodia such as, for example, Zeosil 1165MP™, silica from Degussa AG with designations such as, for example, VN3™, and silica from J. M. Huber such as, for example, Hubersil 4155™ and silica from PPG Industries such as, for example, HiSil 21™.

In practice, use of a silica coupling agent to enhance a precipitated silica's reinforcing effect for elastomers as is well known to those having skill in such art. Here the silica coupling agent is optionally used to selectively enhance the precipitated silica's reinforcing effect for the EPDM rubber in a rubber composition composed of both an EPDM rubber and conjugated diene-based elastomers. Such coupling agent contains a moiety reactive with hydroxyl groups (e.g. silanol groups) contained on the precipitated silica and another different moiety active with a low level of carbon-to-carbon double bond content contained in said EPDM elastomers.

In one embodiment, for said sequential phase mixing process, said first rubber composition, prepared in said first mixing phase, is comprised of said EPDM rubber to a substantial exclusion of (e.g. without) said conjugated diene-based rubber (e.g. less than 10 phr and alternately without of conjugated diene-based elastomer).

In one embodiment, for said parallel phase mixing process, said first rubber composition, prepared in the first mixing phase, is mixed with said EPDM to a substantial exclusion of (e.g. without) said conjugated diene-based rubber (e.g. less than about 10 phr of and alternately without said conjugated diene-based rubber).

In one embodiment, for said parallel phase mixing process, said second rubber composition, prepared in the second mixing phase, is mixed with said at least one conjugated diene-based rubber to the substantial exclusion of (e.g. without) said EPDM rubber (e.g. less than about 10 phr of and alternately without said EPDM rubber), to form a second rubber composition.

In practice, a sulfur curative for said sequential and parallel phase mixing processes is comprised of said elemental sulfur and at least one organic sulfur vulcanization accelerator, activator (e.g. zinc oxide and/or, fatty acid) and, optionally, vulcanization retarder. Such sulfur vulcanization accelerators and retarders are well known to those having skill in such art.

In one embodiment, for said sequential and parallel phase mixing processes, for said first phase mixing to prepare said first rubber composition, it is desired that a volume percent ratio of said filler(s) to said elastomer(s) is greater than 1/1.

In one embodiment, for said sequential and parallel phase mixing processes, for said second phase mixing to prepare said second rubber composition, it is desired that a volume percent ratio of said filler(s) to said elastomer(s) is less than 1/1.

Accordingly, a significant aspect of the invention insofar as said phase mixed rubber composition is the providing of a rubber composition comprised of EPDM rubber and conjugated diene based rubber in which:

(A) for the sequential and parallel phase mixing processes of this invention, the EPDM rubber phase, (the first rubber composition) contains the major portion of the particulate filler reinforcement (e.g. rubber reinforcing carbon black and precipitated silica, which may also optionally include exfoliated clay platelets), and (B) for the parallel phase mixing process of this invention, the EPDM rubber phase (the first rubber composition) contains the major portion of filler reinforcement as well as a major portion of sulfur vulcanization curative(s).

A significant aspect of the sequential phase mixed rubber composition is considered herein to be the presence of the filler reinforced EPDM rubber-containing phase which in turn is considered herein to be significant in the sense of promoting improvement of physical properties of the EPDM phase, such as for example its stiffness, in order to promote one or more beneficial physical properties of the rubber composition itself such as, for example, dynamic fatigue resistance, tear strength, ultimate tensile strength, ultimate elongation, and hysteresis for the tire sidewall outer (atmospherically exposed) layer.

A significant aspect of the parallel phase mixed (Y-mixed) rubber composition is considered herein, in addition to said promoting of one or more physical properties according to said sequential phase mixing process, to be promoting an increased sulfur cure rate to enhance compatibility with cure rates of a higher unsaturated conjugated diene-based rubber as well as promoting one or more physical properties such as, for example, tear strength and adhesion between adjoining tire component(s), namely tire sidewall plies, comprised of at least one conjugated diene-based elastomer as well to itself.

A significant aspect of the invention insofar as using, in the blend of EPDM rubbers, a relatively elastomeric EPDM rubber having a relatively high non-conjugated diene content (ultra high molecular weight and relatively narrow molecular weight distribution) to promote sulfur cure rate compatibility and interface strength between the EPDM and conjugated diene-based elastomer phases of the rubber composition and wherein its ultra high molecular weight is considered herein to promote a higher crosslink network within the rubber composition to further promote physical rubber properties.

Another significant aspect of the invention is enhancement of selective precipitated silica bonding to the EPDM portion of the rubber composition through an enhanced silica coupling agent content added selectively to the EPDM rubber.

A significant aspect of the invention of using a blend of EPDM rubbers, in which one of the EPDM rubbers is semi-crystalline EPDM rubber because of its increased ethylene contend, which enables such EPDM rubber to be a relatively self reinforcing elastomer to promote an improvement of the mechanical strength of the EPDM phase of the rubber composition, particularly when used with the selective blending of said precipitated silica in combination with selective enhanced elevated contend of silica coupling agent with the EPDM rubber phase.

Representative of said non-conjugated diene for said EPDM are, for example, and as hereinbefore discussed, ethylidene norbornene, dicyclopentadiene and trans 1,4-hexadiene.

In further accordance with this invention, a rubber composition is provided as being prepared by said sequential phase mix process.

In additional accordance with this invention, a rubber composition is provided as being prepared by said parallel phase mix process (Y-mix process).

In further accordance with this invention, a pneumatic rubber tire is provided having a outer (e.g. visible, atmospherically exposed) rubber sidewall layer wherein said outer sidewall layer is a sulfur cured rubber layer composition comprised of said sequential phase mixed rubber composition, or said parallel phase mixed rubber composition.

Representative of said first EPDM rubber is a commercially available elastomer such as for example BUNA EP T 4969™ from the Lanxess Company understood to have an ethylene/propylene ratio of about 62/28, namely an ethylene content (units derived from ethylene) of about 62 percent, and a non-conjugated diene content of about 10 percent, wherein said non-conjugated diene is ethylidene norbornene.

Representative of said second EPDM rubber is a commercially available elastomer such as for example BUNA EP T 6470™ from the Lanxess Company which is understood to understood to have an ethylene/propylene ratio of about 68/27, namely an ethylene content (units derived from ethylene) of about 68 percent, and a non-conjugated diene content of about 5 percent, wherein said non-conjugated diene is ethylidene norbornene.

It is important to appreciate that significant differences between the two EPDMs are the ethylene contents, with the difference between 62 and 68 percent being sufficiently different in the sense of promoting a greater crystalline content for the respective EPDM containing the 68 percent ethylene content and reduced non-conjugated diene content of 5 percent, and the respective EPDM having a lower ethylene content of 62 percent and increased non-conjugated diene content of 10 percent being sufficient to promote greater (e.g. stronger) elastomeric properties for the respective EPDM.

Therefore the BUNA EP T 4969 EPDM which has a significantly less ethylene content (62 percent) and significantly greater non-conjugated diene content (10 percent) and would therefore be expected to be more elastomeric in nature.

Therefore the BUNA EP T 6470 EPDM which has a significantly greater ethylene content (68 percent) to promote a greater crystalline content, and significantly less non-conjugated diene content (5 percent) and would therefore be expected to be less elastomeric in nature.

For the purposes of this description, said sequential phased mixed rubber composition and said parallel phase mixed (Y-mixed) rubber composition represent rubber compositions which have been compounded with appropriate compounding ingredients such as, for example, said carbon black, oil, stearic acid, zinc oxide, silica where used, wax, anti-degradants, resin(s) and curatives as sulfur and at least one sulfur vulcanization accelerator.

It is readily understood by those having skill in the art that the rubber compositions of the sidewall would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, the indicated rubber reinforcing carbon black as well as the indicated optional exfoliated clay platelets. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise, for example, about 0.5 to about 10 phr, usually about 1 to about 5 phr. Typical amounts of processing aids may comprise, for example, from about 1 to 20 phr. Such processing aids can include, for example, aromatic, naphthenic, and/or paraffinic processing oils. Typical amounts of antioxidants comprise, for example, about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants may comprise, for Example 1 about 1 to about 5 phr. Typical amounts of fatty acids, if used, which can include stearic acid comprise, for example, about 0.5 to about 3 phr. Typical amounts of zinc oxide comprise, for example, about 2 to about 6 phr. Typical amounts of waxes, if used, comprise, for example, about 1 to about 5 phr. Often microcrystalline waxes are used. Typical amounts of peptizers, if used, may comprise, for example, about 0.1 to about 1 phr. Typical peptizers may be, for example, pentachlorothiophenol and dibenzamidodiphenyl disulfide. The presence and relative amounts of the above additives are considered to be not an aspect of the present invention unless otherwise indicated.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging, for example, from about 0.5 to about 4 phr, with a range of from about 0.5 to about 2.25 sometimes being preferred.

Vulcanization accelerator(s) are used to control the time and/or temperature required for vulcanization and to improve the properties of the vulcanizate. In one embodiment, a single accelerator system may be used, i.e., primary accelerator. Conventionally, a primary accelerator is used in amounts ranging, for example, from about 0.5 to about 2.0 phr. In another embodiment, combinations of two or more accelerators which the primary accelerator may generally used in the larger amount, for example from about 0.5 to about 2 phr, and a secondary accelerator which is generally used in smaller amounts of, for example, from about 0.05 to about 0.50 phr in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention unless otherwise indicated.

Sometimes a combination of antioxidants, antiozonants and waxes may be collectively referred to as antidegradants.

The tire can be built, shaped, molded to include said outer sidewall rubber layer and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE 1

Evaluation of Sequential Phase Mixing Process

Phase mixing of two different EPDM rubbers with a combination of both cis 1,4-polyisoprene natural rubber and cis 1,4-polybutadiene rubber with reinforcing filler composed of carbon black and precipitated silica is evaluated in comparison to a more simple homogeneous mixing of the ingredients.

For such evaluation, the rubber samples are referred to herein as:

(A) Control rubber Sample A in which the ingredients are mixed in a homogeneous manner.

(B) Comparative rubber Sample B in which carbon black is used as particulate rubber reinforcement in a sequential phase mixing sequence.

(C) Experimental rubber Samples C, D and E in which carbon black, silica, silica coupling agent and EPDM rubber are phase mixed with conjugated diene elastomer(s) in a sequential phase mixing process.

In particular, Control rubber Sample A was prepared by a process of simply homogeneously mixing cis 1,4-polybutadiene elastomers, natural cis 1,4-polyisoprene rubber and reinforcing filler composed of rubber reinforcing carbon black together in an internal rubber mixture in a non-productive mixing stage (without the sulfur curatives) to a temperature of about 160° C. Thereafter, the rubber mixture is mixed in a productive mixing stage in an internal rubber mixer to a temperature of about 110° C. in which the sulfur curatives, including elemental sulfur, were mixed.

The rubber composition is cooled to below 40° C. after each of the mixing stages.

Comparative rubber Sample B was prepared by a sequential phase mixing process in which most of the carbon black reinforcement is blended with the EPDM, with the EPDM being composed of two different EPDM rubbers, in a first non-productive mixing step (NP1) in an internal rubber mixer to a temperature of about 160° C. to form a carbon black reinforced EPDM phase.

The rubber mixture was dumped from the rubber mixer, sheeted out and allowed to cool to below 40° C.

In a second non-productive mixing step (NP2), the rubber mixture (from NP1) was mixed with the remainder of the rubber reinforcing carbon black together with natural cis 1,4-polyisoprene rubber in an internal rubber mixer to a temperature of about 160° C. to form an EPDM-containing rubber composition in which a major portion of the carbon black reinforcement is preferentially associated with the EPDM rubber.

The rubber mixture was dumped from the rubber mixer, sheeted out and allowed to cool to below 40° C.

In a subsequent, sequential productive mixing step (P), sulfur curative including elemental sulfur and vulcanization accelerator are blended with the sequential phase-mixed rubber composition in an internal rubber mixer to temperature of about 110° C. and the phase mixed rubber mixture with curatives dumped from the mixer and allowed to cool to below 40° C.

Experimental rubber composition Sample C was prepared by a sequential phase mixing process in which all of the silica reinforcement and most of the carbon black reinforcement is blended with the two different EPDM rubbers in a first non-productive mixing step (NP1) in an internal rubber mixer to form a silica and carbon black reinforced EPDM phase to a temperature of about 160° C.

The rubber mixture was dumped from the rubber mixer, sheeted out and allowed to cool to below 40° C.

In a second non-productive mixing step (NP2), the rubber mixture (from NP1) was mixed with the remainder of the rubber reinforcing carbon black together with natural cis 1,4-polyisoprene rubber in an internal rubber mixer to a temperature of about 160° C.

The rubber mixture was dumped from the rubber mixer, sheeted out and allowed to cool to below 40° C.

Experimental rubber composition Samples D and E were prepared by a sequential phase mixing process in which all of the silica reinforcement and most of the carbon black reinforcement is blended with two different EPDM's in a first non-productive mixing step (NP1) in an internal rubber mixer to a temperature of about 160° C. to form a silica and carbon black reinforced EPDM phase.

The rubber mixture was dumped from the rubber mixer, sheeted out and allowed to cool to below 40° C.

In a second non-productive mixing step (NP2), the rubber mixture (from NP1) was mixed with the remainder of the rubber reinforcing carbon black together with a combination of natural cis 1,4-polyisoprene rubber and cis 1,4-polybutadiene rubber in an internal rubber mixer to a temperature of about 160° C.

The rubber mixture was dumped from the rubber mixer, sheeted out and allowed to cool to below 40° C.

For the resulting sequentially phase mixed rubber compositions of Experimental rubber Samples C, D and E, the silica reinforcement is therefore primarily associated with the EPDM rubber phase of the rubber composition.

The general compositions of the rubber Control rubber Sample A, Comparative Phase Mixed rubber Sample B and Experimental Phase Mixed rubber Samples C, D and E are illustrated in the following Table 1.

TABLE 1

|  | Control | Comparative | Experimental | | |
|---|---|---|---|---|---|
|  | A | B | C | D | E |
| Non Productive Mixing Step (NP1) | | | | | |
| First EPDM rubber[1] | 0 | 60 | 60 | 60 | 60 |
| Second EPDM rubber[2] | 0 | 20 | 20 | 20 | 20 |
| Cis 1,4-polyisoprene rubber[3] | 60 | 0 | 0 | 0 | 0 |
| Cis 1,4-polybutadiene rubber[4] | 40 | 0 | 0 | 0 | 0 |
| Carbon black[5] | 51 | 42 | 30 | 30 | 30 |
| Tackifier resin[6] | 3.5 | 3 | 3 | 3 | 3 |
| Silica[7] | 0 | 0 | 30 | 15 | 15 |
| Coupling agent A[8] | 0 | 0 | 5 | 0 | 0 |
| Coupling agent B[9] | 0 | 0 | 0 | 4 | 4 |
| Rubber plasticizers[10] | 13.8 | 3 | 3 | 3 | 8 |
| Fatty acid[11] | 2 | 2 | 2 | 2 | 2 |
| Non Productive Mixing Step (NP2) | | | | | |
| Cis 1,4-polyisoprene rubber[3] | 0 | 50 | 50 | 30 | 30 |
| Cis 1,4-polybutadiene rubber[4] | 0 | 0 | 0 | 20 | 20 |
| Carbon black[5] | 0 | 8 | 8 | 8 | 8 |
| Rubber plasticizers[10] | 0 | 0 | 3 | 3 | 8 |
| Productive Mixing Step (P) | | | | | |
| Zinc oxide | 5 | 5 | 5 | 5 | 5 |
| Sulfur | 1.8 | 1.5 | 1.5 | 1 | 1 |
| Accelerator A[12] | 2.2 | 1.9 | 1.9 | 1.6 | 1.6 |
| Accelerator A[13] | 0 | 0 | 0 | 1 | 1 |

[1]EPDM rubber as BUNA EP T 4969 from Lanxess Company as a terpolymer comprised of (units derived from) about 62 weight percent ethylene, 28.2 weight percent propylene and about 9.8 weight percent ethylidene norbornene (ENB). The EPDM is oil extended by containing 50 weight percent rubber processing oil and is reported in Table 1 based on the composite of EPDM and oil.
[2]EPDM rubber as BUNA EP T 6470 from Lanxess Company as a terpolymer comprised of (units derived from) about 68 weight percent ethylene, 27.5 weight percent propylene and about 4.5 weight percent ethylidene norbornadiene
[3]Cis 1,4-polyisoprene natural rubber (SMR-20)
[4]Cis 1,4-polybutadiene rubber as Bud1207 from The Goodyear Tire & Rubber Company
[5]Carbon black as N550, an ASTM designation
[6]Tackifier resin as a phenolic resin
[7]Precipitated silica as Zeosil ™ Z1165 MP from the Rhodia Company
[8]Coupling agent A as Si266 ™ from the Evonik Degussa Company comprised of a composite of carbon black and bis(3-triethoxysilylpropyl) disulfide having an average in a range of about 2 to about 2.6 connecting sulfur atoms in its polysulfidic bridge in a 50/50 weight ratio and reported in the Table as the composite
[9]Coupling agent B as Si69 ™ from the Evonik Degussa Company comprised of a composite of carbon black and bis(3-triethoxysilylpropyl) tetrasulfide having an average in a range of about 4 connecting sulfur atoms in its polysulfidic bridge in a 50/50 weight ration and reported in the Table as a composite
[10]Rubber plasticizers as aromatic/paraffinic oil
[11]Fatty acid comprised of stearic, palmitic and oleic acids
[12]Sulfur vulcanization accelerator of the sulfenamide and thiazole type
[13]Sulfur vulcanization accelerator of the Hexamethylenetetramine type Various physical properties of the Samples of the rubber compositions are shown in the following Table 2. Where appropriate, the Samples were cured for about 12 minutes at a temperature of about 170° C.

TABLE 2

|  | Control | Comparative | Experimental | | |
|---|---|---|---|---|---|
|  | A | B | C | D | E |
| Ingredients | | | | | |
| First EPDM rubber (phr) | 0 | 60 | 60 | 60 | 60 |
| Second EPDM rubber (phr) | 0 | 20 | 20 | 20 | 20 |
| Cis 1,4-polyisoprene rubber (phr) | 60 | 0 | 0 | 0 | 0 |
| Cis, 4-polybutadiene rubber (phr) | 40 | 0 | 0 | 0 | 0 |
| Carbon black (phr) | 51 | 42 | 30 | 30 | 30 |
| Silica (phr) | 0 | 0 | 30 | 15 | 15 |
| Coupling agent A (phr) | 0 | 0 | 5 | 0 | 0 |
| Coupling agent B (phr) | 0 | 0 | 0 | 4 | 4 |

TABLE 2-continued

|  | Control | Comparative | Experimental | | |
|---|---|---|---|---|---|
|  | A | B | C | D | E |
| ATS[1] | | | | | |
| Tensile strength (MPa) | 12.3 | 14.7 | 14.8 | 13.9 | 12.4 |
| Elongation at break (%) | 714 | 691 | 690 | 745 | 767 |
| 100% modulus, ring (MPa) | 0.82 | 1.18 | 1.33 | 1.12 | 0.95 |
| 300% modulus, ring (MPa) | 3.42 | 4.82 | 5.11 | 4.19 | 3.4 |
| Hardness, Shore A | | | | | |
| 23° C. | 45.5 | 54 | 59.5 | 53.1 | 49.2 |
| 100° C. | 42.2 | 44 | 48.3 | 42.4 | 38.6 |
| Rebound | | | | | |
| 23° C. | 53.4 | 58 | 52.9 | 58.7 | 58.5 |
| 100° C. | 57.6 | 62 | 57.2 | 59.1 | 57.8 |
| DeMattia Cut-Growth Resistance with Wedge Pierced[2] | | | | | |
| Original Rate at 95° C. (minutes/cm) | 35 | 17 | 50 | 123 | 396 |
| Aged (70° C./7 Days) Rate at 95° C. (min./cm) | 7 | 17 | 40 | 146 | 123 |
| Cyclic Flex Fatigue[3] (average cycles to break for 6 specimens or a million cycles if specimen doesn't break) (data expressed in Kilocycles) | | | | | |
| Original samples | 1000 | 878 | 1000 | 1000 | 1000 |
| Aged sample-Samples A, B & E broke before reaching a million cycles | 793 | 894 | 1000 | 1000 | 935 |
| Dynamic Ozone Test 4 (Sample stretched 0-60% strain; 50 pphm exposure, 40° C., 48 hrs) | | | | | |
| Surface Crack population (Many/None) | Many | None | None | None | None |
| Sample broke (Yes/No) | Yes | No | No | No | No |
| Tear strength (to self)5, 95° C., Steady state average load (Newtons) | | | | | |
| Original, unaged | 168 | 114 | 30 | 164 | 125 |
| Aged, 70° C., 7 days | 71 | 87 | 76 | 127 | 150 |
| Adhesion Tear Strength[6], 95° C., steady state average load (Newtons) | | | | | |
| Adhesion Strength to rubber ply | 61 | 12 | 15 | 94 | 92 |
| Adhesion Strength to wirecoat | 90 | — | 15 | 113 | 108 |

[1]Data obtained according to Automated Testing System (ATS) instrument
[2]ASTM D 813
[3]ASTM D4482
[4]ASTM3395
[5]Data obtained according to a peel strength adhesion (tear strength) test to determine interfacial adhesion between two samples of the same rubber composition. In particular, such interfacial adhesion is determined by pulling one rubber composition away from the other at a right angle to the untorn test specimen with the two ends of the rubber compositions being pulled apart at a 180° angle to each other using an Instron instrument.
[6]Data obtained according to a peel strength adhesion (tear strength) test to determine interfacial adhesion between two samples of the two rubber compositions. In particular, such interfacial adhesion is determined by pulling two rubber compositions away from the other at a right angle to the untorn test specimen with the two ends of the rubber compositions being pulled apart at a 180° angle to each other using an Instron instrument.

From Table 2 it can be seen that, for the DeMattia cut-growth resistance test for Experimental rubber Samples C, D and E, the cut-growth resistance rates for both original and aged (70° C. for 7 days) samples were significantly greater, especially Experimental rubber samples D and E which are combination effects of the sequential phase mixing and added cis 1,4-polybutadiene rubber of the rubber composition, than the cut-growth resistance rates for Control rubber Sample A and Comparative rubber Sample B. This is considered herein to be a result of better silica reinforcement of the EPDM portion of the rubber composition (better silica reinforcement due to the enhanced silica coupler selectively administered to the EPDM portion) as a result of the sequential phase mixing which resulted in an improved overall the DeMattia cut-growth resistance rates of rubber Samples D and E from 123 to 396 minutes/cm as compared to 7 to 35 for rubber Control A and Comparative rubber Sample B which more than three times the fatigue resistance.

From Table 2 it can also be seen that, for the cyclic (dynamic) flex fatigue test for Experimental rubber Samples C, D, and E, the average cycles to failure for both the original and aged rubber Samples were greater than the average cycles to failure for original Comparative rubber Sample B. This is considered herein to be a result of better silica reinforcement of the EPDM portion of the rubber composition (better silica reinforcement due to the enhanced silica coupler selectively administered to the EPDM portion) as a result of the sequential phase mixing which resulted in an improved overall resistance to dynamic flex failure of rubber Samples C, D and E near 1,000,000 cycles as compared to near 900,000 cycles Comparative rubber Sample B which improves the fatigue life.

From Table 2 it can also be seen that static average load from the aged tear strength test for the Experimental rubber Samples D and E (more than 127 Newtons) was significantly higher than that of the Control rubber Sample A (71 Newtons) and the Comparative rubber Sample B (87 Newtons). This is also considered herein to which are combination effects of the sequential phase mixing and added Cis 1,4-polybutadiene rubber of the rubber composition. The sequential phase mixing be a result of better silica reinforcement of the EPDM portion of the rubber composition (better silica reinforcement due to the enhanced silica coupler selectively administered to the EPDM portion) as a result of the sequential phase mixing. Adding Cis 1,4-polybutadiene rubber of the rubber composition to improve the resistance of crack growth.

From Table 2 it can also be seen that both original and aged adhesion strength to adjacent components (ply and wirecoat compounds) for the Experimental rubber Samples D and E (92 to 113 Newtons) was significantly higher than that of the Control rubber Sample A (61 to 90 Newtons) and the Comparative rubber Sample B (12 Newtons). This is also considered herein to be a result of better silica reinforcement of the EPDM portion of the rubber composition (better silica reinforcement due to the enhanced silica coupler selectively administered to the EPDM portion) as a result of the sequential phase mixing.

Such improved results of the dynamic flex fatigue tests (DeMattia and cyclic fatigue), the tear strength test, and the adhesion to adjacent components, are considered herein to be significant in a sense that they are indications of an extended fatigue life and dynamic strength of an outer tire sidewall layer based upon Experimental rubber Samples D and E.

Accordingly, it is concluded from this Example that the combination effects of the phase mixing process and added Cis 1,4-polybutadiene rubber. The phase mixing process provided by this invention utilizes the indicated EPDM elastomers with silica and coupling agent reinforcement to promote bonding both strength of the EPDM elastomers and interface bonding strength between the EPDM phase and Diene phase of the rubber composition. This also promote bonding strength to adjacent components (ply and wirecoat compounds). Adding Cis 1,4-polybutadiene rubber of the rubber composition to improve the resistance of crack growth of the rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a rubber composition which comprises, based upon parts by weight per 100 parts by weight rubber (phr):
   (A) a sequential phase mixing process which comprises:
      (1) a first mixing phase comprised of forming a first rubber composition comprised of EPDM rubber containing a dispersion of a particulate filler reinforcement therein, followed by:
      (2) a second mixing phase comprised of forming a second rubber composition by blending said first rubber composition with at least one conjugated diene-based rubber wherein said conjugated diene-based rubber includes a cis 1,4-polyisoprene rubber, followed by:
      (3) blending sulfur curative comprised of elemental sulfur with said second rubber composition, or
   (B) a parallel phase mixing process which comprises:
      (1) a first mixing phase comprised of forming a first rubber composition by blending EPDM rubber, particulate rubber reinforcing filler and sulfur curative comprised of elemental sulfur;
      (2) a second mixing phase comprised of forming a second rubber composition of:
         (a) cis 1,4-polyisoprene rubber, or
         (b) cis 1,4-polyisoprene rubber and cis 1,4-polybutadiene rubber;
      wherein said second rubber composition optionally also contains at least one of styrene/butadiene rubber, butyl rubber, halogenated butyl rubber, and brominated copolymer of paramethylstyrene and isobutylene, followed by
      (3) blending said first rubber composition with said second rubber composition;
   wherein, for said sequential and parallel phase mixing processes, said EPDM rubber is provided as:
      (4) an EPDM rubber as an ethylene/propylene/non-conjugated diene terpolymer having an ethylene content in a range of from about 40 to about 90 weight percent and a non-conjugated diene content in a range of about 1 to about 15 weight percent, or
      (5) a combination of EPDM elastomers as ethylene/propylene/non-conjugated diene terpolymers composed of:
         (a) a first EPDM rubber having an ethylene content of from about 40 to about 70 weight percent, and a non-conjugated diene content in a range of about 1 to about 15 weight percent, and
         (b) a second EPDM rubber having an ethylene content of from about 60 to about 90 weight percent, and a non-conjugated diene content in a range of about 1 to about 15 weight percent,
      wherein the ethylene content of said second EPDM rubber is at least 10 percentage units higher than the ethylene content of said first EPDM rubber, and
      wherein the weight ratio of said first EPDM rubber to said second EPDM rubber is in a range of from about 10/90 to about 90/10,
   wherein said first rubber composition for said first mixing phase contains:
      (6) particulate reinforcing filler comprised of:
         (a) precipitated silica in an amount of up to about 80 phr,
         (b) optionally exfoliated clay platelets in an amount of up to 10 phr,
         (c) rubber reinforcing carbon black in an amount of up to 100 phr, and
      wherein additional low unsaturation polymers are included with the EPDM rubber in the first mixing phase consisting of at least one of polyethylene and polypropylene.

2. The process of claim 1 wherein said process is said sequential phase mixing process.

3. A rubber composition prepared by the process of claim 2.

4. The process of claim 1 wherein said process is said parallel phase mixing process.

5. A rubber composition prepared by the process of claim 4.

6. A rubber composition prepared by the process of claim 1.

7. An article of manufacture having at least one component comprised of the rubber composition of claim 6.

8. A tire having a component comprised of the rubber composition of claim 6.

9. A tire having an outer sidewall layer comprised of the rubber composition of claim 6.

* * * * *